United States Patent [19]
Christenson

[11] Patent Number: 6,123,347
[45] Date of Patent: Sep. 26, 2000

[54] TAG AXLE SYSTEM

[75] Inventor: Ronald E. Christenson, Parsons, Tenn.

[73] Assignee: McNeilus Truck and Manufacturing, Inc., Dodge Center, Minn.

[*] Notice: Under 35 U.S.C. 154(b), the term of this patent shall be extended for 436 days.

[21] Appl. No.: 08/868,480

[22] Filed: Jun. 3, 1997

Related U.S. Application Data

[63] Continuation of application No. 08/405,793, Mar. 16, 1995, abandoned.

[51] Int. Cl.⁷ ...................................................... B62D 61/12
[52] U.S. Cl. ..................... 280/86.5; 180/24.02; 180/209; 280/47.23; 280/124.116; 280/764.1
[58] Field of Search .................................. 280/704, 711, 280/47.23, 764.1, 405.1, 43.17, 86.5, 124.11, 124.116, 124.157; 180/24.02, 209

[56] References Cited

U.S. PATENT DOCUMENTS

| | | |
|---|---|---|
| 3,191,963 | 6/1965 | Prichard ................................ 280/43.23 |
| 3,739,927 | 6/1973 | Gollnick . |
| 5,090,495 | 2/1992 | Christenson . |
| 5,516,135 | 5/1996 | Christenson ............................ 280/711 |

FOREIGN PATENT DOCUMENTS 229651   6/1960   Australia .............................. 280/43.17

Primary Examiner—Eric Culbreth
Attorney, Agent, or Firm—Nikolai, Mersereau & Dietz, P.A.

[57] ABSTRACT

A selectively deployable auxiliary wheel system for a refuse collecting vehicle includes a pair of spaced tag axle assemblies. The system can be used with any type of refuse vehicle and is designed to mount either to the truck or the tailgate. Each assembly includes a suspension system including an axle mounting lever carried by a transverse tag pivot shaft and carrying a stub axle and a wheel on the stub axle. A fluid operated tag axle deployment system is used for applying forces to control the deployment of the tag axle between a ground engaging vehicle supporting position and a stowed position. In one embodiment, the system uses a pair of fixed pneumatic springs and a pair of torque arm levers to pivot the axle mounting lever such that the displacement of one of the levers relative to stationary mounting supports raises or lowers the axle mounting lever. In another embodiment, the displacement of a single torque arm lever relative to a stationary mounting support by a single, double-acting hydraulic cylinder device controls the deployment of the tag axle between a ground engaging, vehicle supporting position and a stowed position.

13 Claims, 21 Drawing Sheets

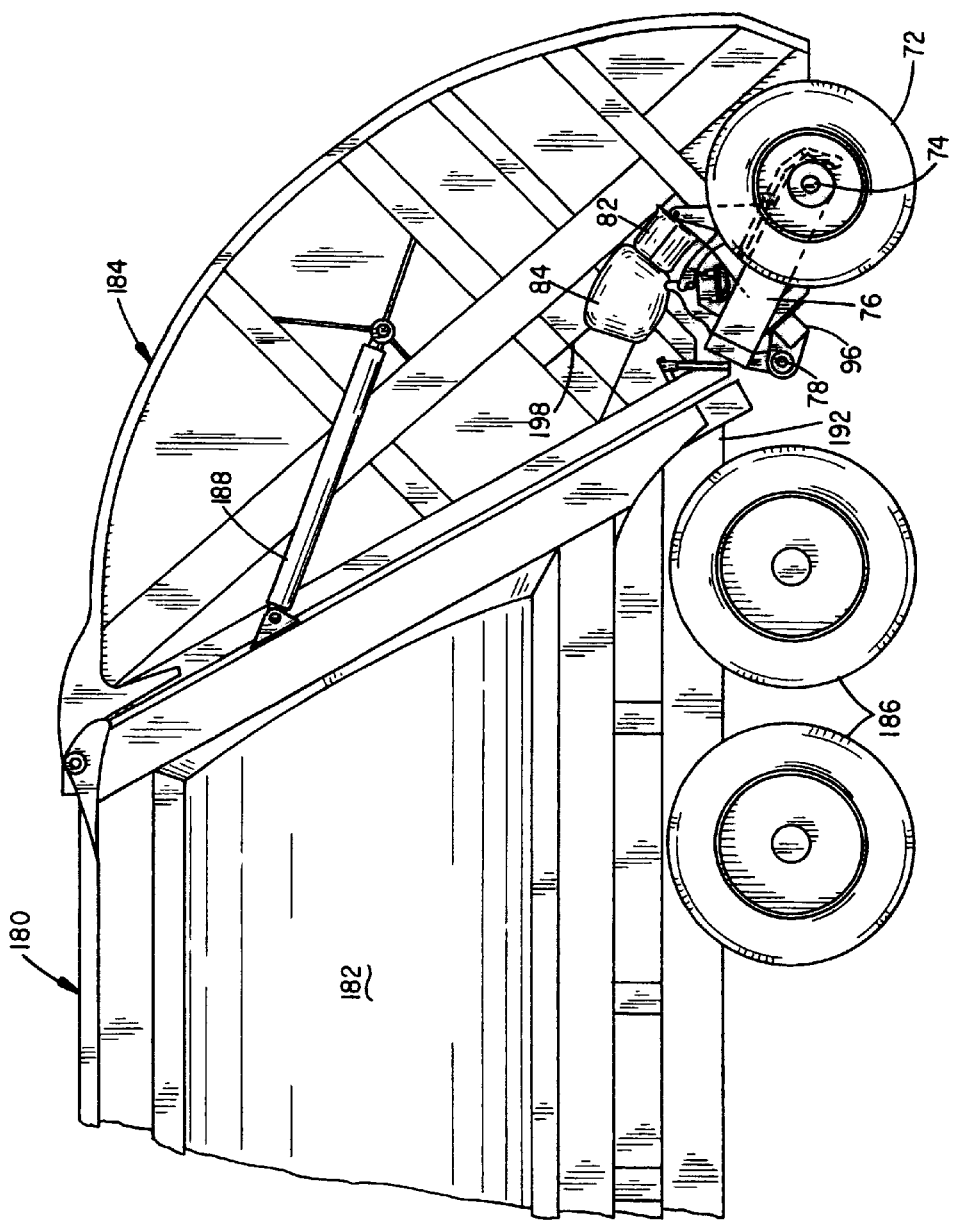

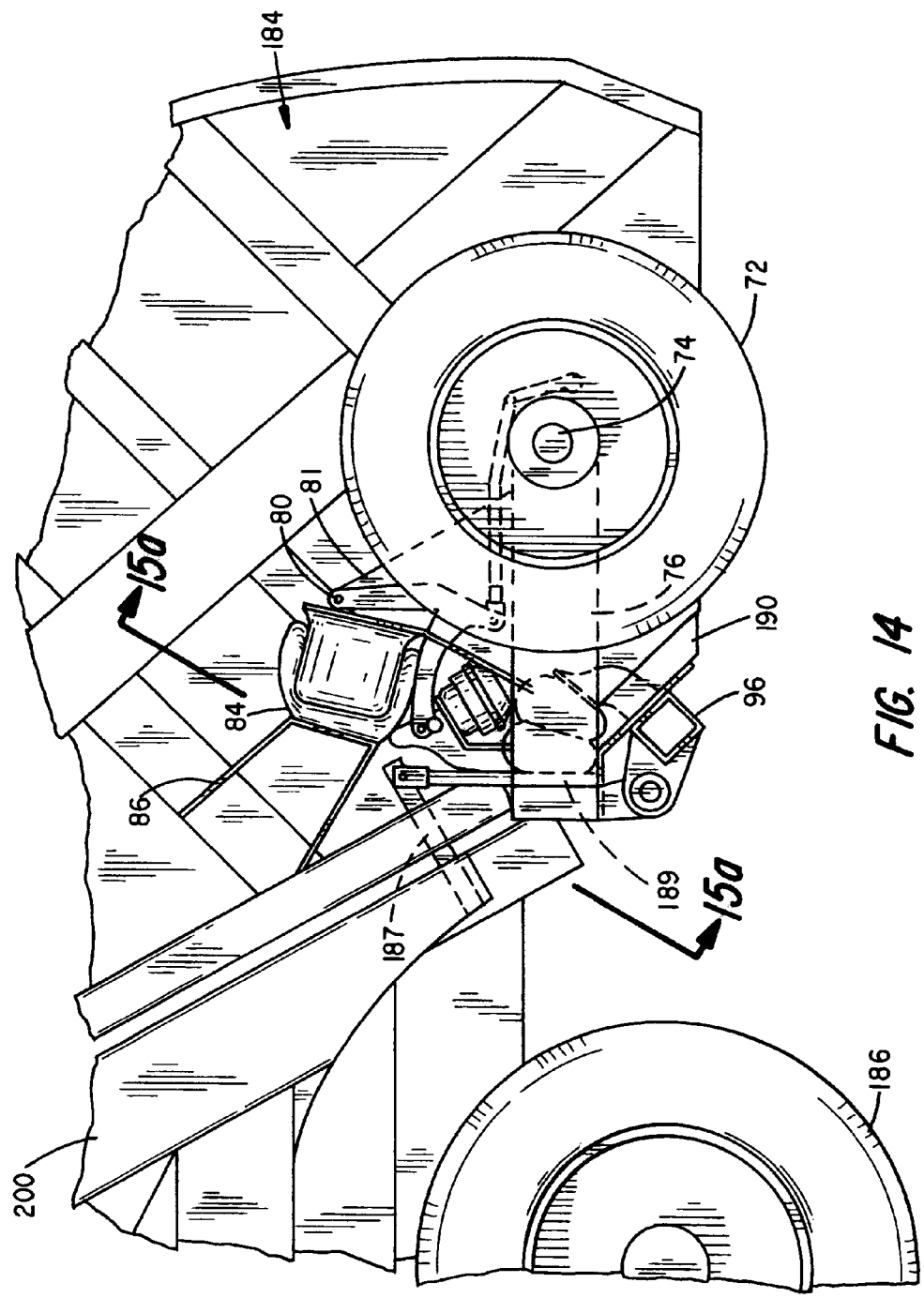

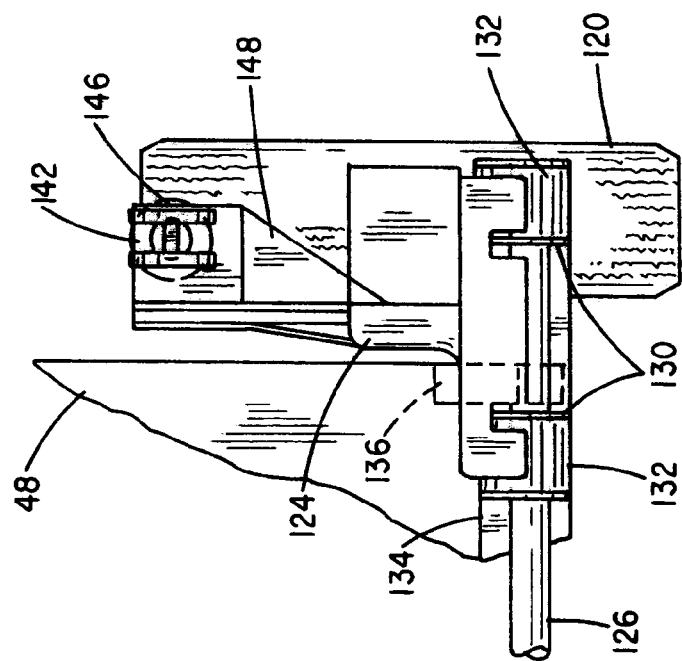
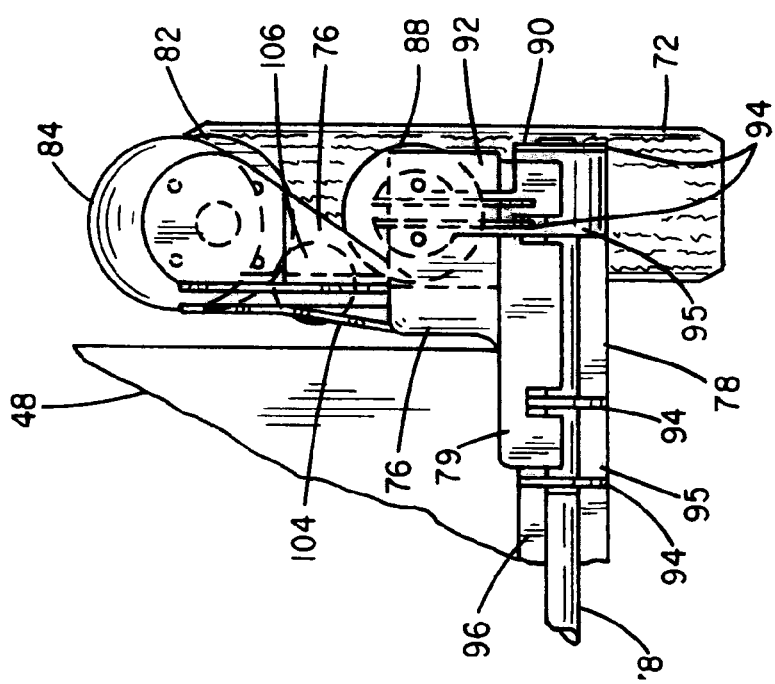
FIG. 15b
FIG. 15a

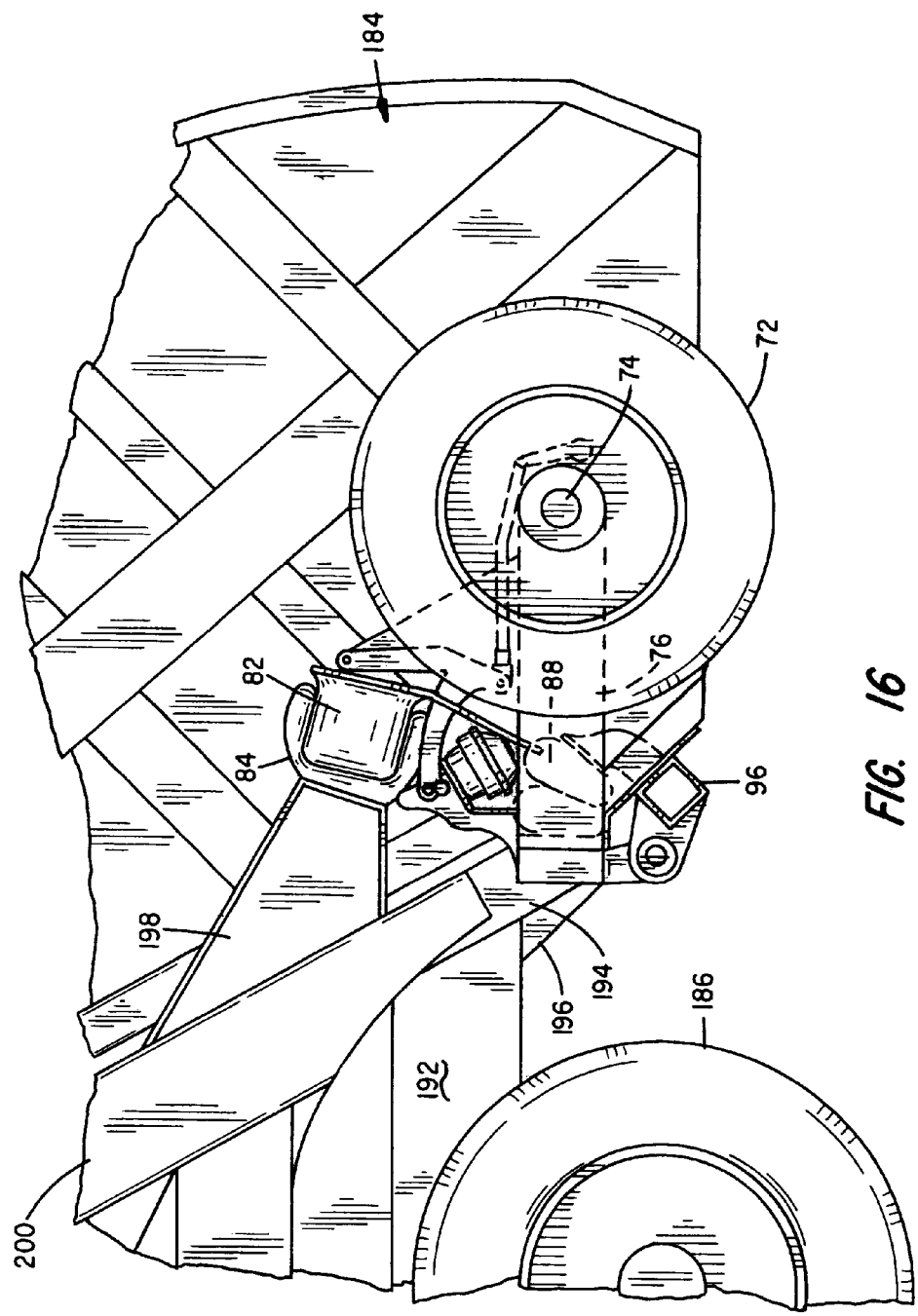

TAG AXLE SYSTEM

This is a continuation of application Ser. No. 08/405,793, filed on Mar. 16, 1995, abandoned.

BACKGROUND OF THE INVENTION

I. Field of the Invention

The present invention is directed generally to a system for redistributing the axle loading of a multi-axle working vehicle of a class associated with transporting rather heavy loads which may not be uniformly carried by or distributed among the several axles of the vehicle. More particularly, the invention is directed to an improved tag axle system and a simple and efficient system for carrying and operating a tag axle between a deployed or ground engaging position and a stowed position. The improved tag axle system of the invention is lightweight and particularly versatile and adaptable to be accommodated by the tailgate structure or truck body structure of a front, side or rear-loading trash compacting refuse truck.

II. Related Art

Auxiliary load support devices deployable between a stowed and ground engaging or support position and commonly known as tandem axle, tag axle or auxiliary axle assemblies have been in use on various types of load-hauling work vehicles for some time. These include, in particular, dump trucks and refuse carrying trucks, or the like, which within a short time span may be driven in a heavily (fully) loaded, empty or in a partially loaded condition. The use of such downward deployable additional axle assemblies, of course, allows such vehicles when heavily loaded to deploy an optional, additional load supporting axle as needed so that the gross or total legal weight such vehicles can carry over the highways is increased at the same per-axle loading. Tag axle systems are generally designed so that they are in a deployed or ground-engaging and supporting posture only when the additional support is needed and are otherwise carried in a raised or stowed position to obviate the additional road friction and tire wear associated with the alternative of adding another permanent axle. Also, the use of a deployable system, in some cases, permits the placement of additional support where the addition or use of a permanent axle system would not be practical, such as, for example, in the case of additional tailgate support.

Devices of the described class designed to lend additional support to areas of vehicles, particularly refuse vehicles, include, for example, a system illustrated in U.S. Pat. No. 5,090,495 to Ronald E. Christenson, the inventor in the present application, and which is assigned to the same assignee as the present application. That reference describes a tag axle system including a pair of spaced stub axles having independently operated suspension systems each for lowering and raising the associated wheel.

While that system may be adapted to any multi-axle load hauling vehicle, it is particularly illustrated as supporting the tailgate of a rear-loading refuse truck having a rear refuse receiving hopper swept by an hydraulic compacting mechanism. The load of a rear-loading vehicle is particularly prone to a rearward directed imbalance because the loading trough area or tailgate hopper extends a considerable distance behind and beyond the normal rear axle and also drops down below the level of the frame of the truck to thereby produce an additional strain on the conventional rear truck axles. To eject packed refuse in such trucks, the entire rear tailgate must be raised and a rearward sweeping ejection mechanism utilized to discharge the refuse from a fully loaded truck at a landfill, or the like. A vehicle of the class is described and illustrated, for example, in U.S. Pat. No. 3,739,927 issued to Gollnick, which is deemed incorporated herein.

In the illustrative embodiment described in the above-referenced '495 patent, the tag axle systems are spaced behind the rear axle of the vehicle with the stub axles on either side of the tailgate of the vehicle. The tag axle assemblies are both carried by and deployable to directly support the tailgate itself and thereby assume part of the weight carried by the rear wheels of the vehicle. The tag axles also produce a leveraging effect to accomplish a forward directed redistribution of an additional portion of the large amount of weight carried by the rear wheels of the vehicle.

In the mounting and deployment system associated with the '495 patent, the tag axle support and deployment system mechanisms which operate to raise and lower the wheel assemblies include fluid operated devices which are preferably pneumatic springs rotatably attached to each end of an eccentric fulcrumed (unequal length leverage arms) lever system such that the inflation of the longer length lever arm pneumatic spring combined with the deflation or collapse of the pneumatic spring attached to the shorter leveraged arm results in the lowering or deployment of the tag axle, and the reverse, in the stowage thereof. The air-operated springs are mounted in a pivotal arrangement such that the ends of the springs are permitted to move and change relative angles in fluctuating between the inflated and collapsed state. While such embodiments have been found to be advantageous for certain applications, it has further been found, for example, that stationary mounting of the pneumatic springs eliminates additional moving parts and further assists in stabilizing the operation of the system. Also, supporting the pair of spaced tag axle assemblies from a common structural member has been found desirable. In addition, in accordance with the present invention, it has further been found possible to operate a tag axle assembly of the invention utilizing a single double-acting hydraulic cylinder for both deployment and retraction.

Accordingly, to improve and simplify the construction and operation of a pair of coordinated tag axles of load hauling vehicles, it is a primary object of the present invention to provide such an improved and simplified system.

Another object of the present invention is to provide an improved and simplified coordinated tag axle system that can be mounted on the tailgate or truck body of any style refuse vehicle.

A further object of the present invention is to provide a tag axle deployment assembly utilizing pneumatic springs of fixed mount.

A still further object of the invention is to provide a tag axle deployment and stowage assembly operated by a single, double-acting hydraulic cylinder.

A yet still further object of the invention is to provide a tag axle support and deployment system that uses separate deployment and stowage levers attached to a common stub axle mounting lever.

Other objects and advantages will occur to those skilled in the art through a familiarization with the specification, claims and drawings associated with the descriptions of the invention.

SUMMARY OF THE INVENTION

The invention provides a deployable auxiliary wheel system for a vehicle that includes a pair of spaced individual tag axle assemblies. Each tag axle assembly includes a stub axle carried on a pivoting axle mounting lever which pivots vertically between a stowed (raised) and deployed (lowered) position and which, in turn, is operated by at least one torque arm or operating lever connected to pivot the tag axle mounting lever using one or more fluid operated devices.

In a hydraulic cylinder operated embodiment, each axle mounting lever (carrying a wheel and stub axle) is mounted to pivot about a journal mounted tag pivot shaft as controlled by a single torque arm lever fixed to the axle mounting lever at another location and attached to the rod end of a double-acting hydraulic cylinder, the cylinder end of which is connected to a fixed mount. The extension of the hydraulic cylinder deploys the tag axle wheel in a ground engaging position and retraction thereof stows the assembly.

In a pneumatic spring operated embodiment, a pneumatic deployment spring is mounted in fixed relation between an elongated deployment torque arm lever connected between the tag axle deployment lever which is mounted to pivot about a journal mounted tag pivot shaft. The spring is expanded to deploy the tag axle by pivoting the deployment torque arm and so the tag axle deployment lever. Conversely, a second lever also connected to the tag axle deployment lever and operated by a second pneumatic spring mounted in fixed relation between the second lever and a fixed mount is inflated to restow the tag axle. The pneumatic springs, of course are further controlled so that when the spring of interest of a pair is inflated, the other spring is vented to atmosphere or collapsed.

In another embodiment, both spaced individual tag axle deployment levers, i.e., the deployment levers carrying both tag axle assemblies, are mounted to a common tag pivot shaft. In this embodiment, the tag pivot shaft may be connected so as to rotate with the pivoting of the tag axle deployment levers to assist in coordinating the deployment and stowing of the pair of spaced tag axle assemblies of the auxiliary wheel system.

The system uses fewer moving parts than previous systems and is thereby more reliable and simpler to construct, operate and maintain. The auxiliary wheel systems of the present invention are designed to be deployed in any manner desired and adapt readily to any type of vehicle, particularly refuse hauling varieties. The tag axle system may be carried on the tailgate of a rear, front or side loading refuse truck, for example, or be carried by the chassis or body of any of these truck models depending on the application desired.

BRIEF DESCRIPTION OF THE DRAWINGS

FIG. 13 is an enlarged fragmentary side view of a rear loading refuse vehicle showing a tailgate mounted, pneumatically operated tag axle assembly in accordance with the invention in the deployed position;

FIG. 14 is a view similar to FIG. 13 with the tag axle shown in the raised or stowed position;

FIG. 15a is an enlarged sectional view taken substantially along 15a—15a of FIG. 14;

FIG. 15b is an enlarged sectional view taken substantially along 15b—15b of FIG. 9;

FIG. 16 is a view similar to FIG. 13 with the tag axle of the invention mounted on the truck body shown in the stowed position;

DETAILED DESCRIPTION

The tag axle system of the present invention is designed to be easily constructed and operated using a minimum of moving parts. The system is one which is adaptable for use on any type of load hauling vehicle and is especially useful in relation to adding hauling capacity to refuse vehicles of all general types on which a tag axle system can be used. These include both front and side loading, rear discharge refuse hauling vehicles in addition to rear loading vehicles.

The tag axle system may be integral with, i.e., carried by and attached to support either the truck body or truck frame or the tailgate of such vehicles. There are advantages to each. While attachment to the tailgate may provide additional desired leveraging of the load, attaching the tag axle system to the frame or body of the vehicle reduces the weight of the tailgate assembly which, in turn, makes it earlier to raise the tailgate to discharge compacted refuse material. The tailgate mounted version, of course, has the advantage that the tag axle system also swings upward and out of the way (clear of the discharge opening of the refuse body) during unloading. The truck body or chassis mounted versions produce a lifting force that acts directly on the chassis or truck body; whereas, most tailgate mounted embodiments apply force directly against the tailgate which must be designed to withstand such forces and remain latched.

The tag axle system of the invention further contemplates a variety of operating mechanisms to raise and lower the tag axle assemblies including pneumatic springs and hydraulic cylinders which employ internal or external gas accumulators to suppress pressure surges in the hydraulic system.

The downward deployable tag axle system of the present invention includes a pair of spaced tag axle assemblies that provide additional support in a balanced manner. The assemblies alternately may be mounted in fixed relation to a common transverse structural member or common shaft. The deployment or retraction of both at the same time can be coordinated in a well-known manner. Several embodiments will next be described with reference to the several drawing views which illustrate some of the adaptations and configurations of the system.

Figure 1:
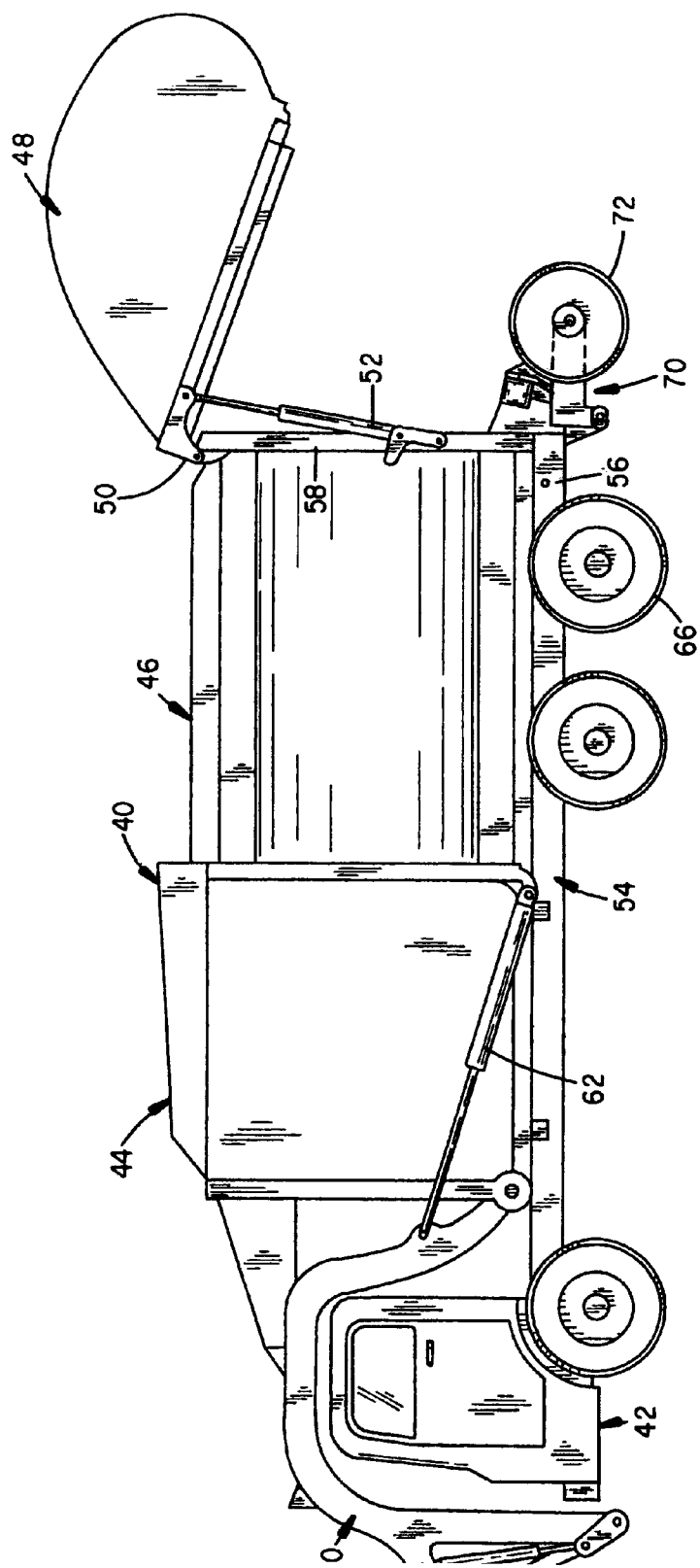
FIG. 1 is a side elevational view of a front loading refuse vehicle shown with tailgate in the raised position, the tag axle of the invention mounted on the truck body in the stowed position.
Figure 2:
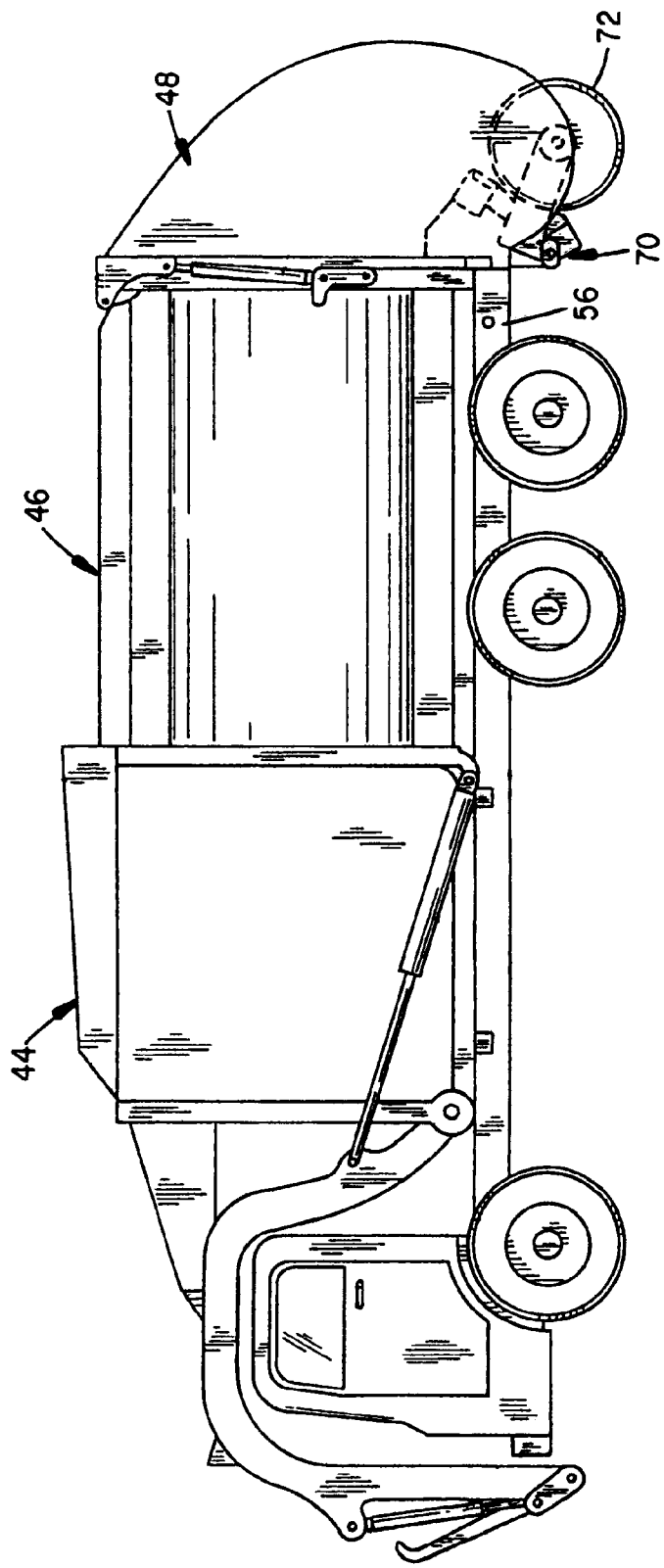
FIG. 2 depicts the refuse vehicle of FIG. 1 with the tailgate closed and the tag axle deployed.
Figure 3:
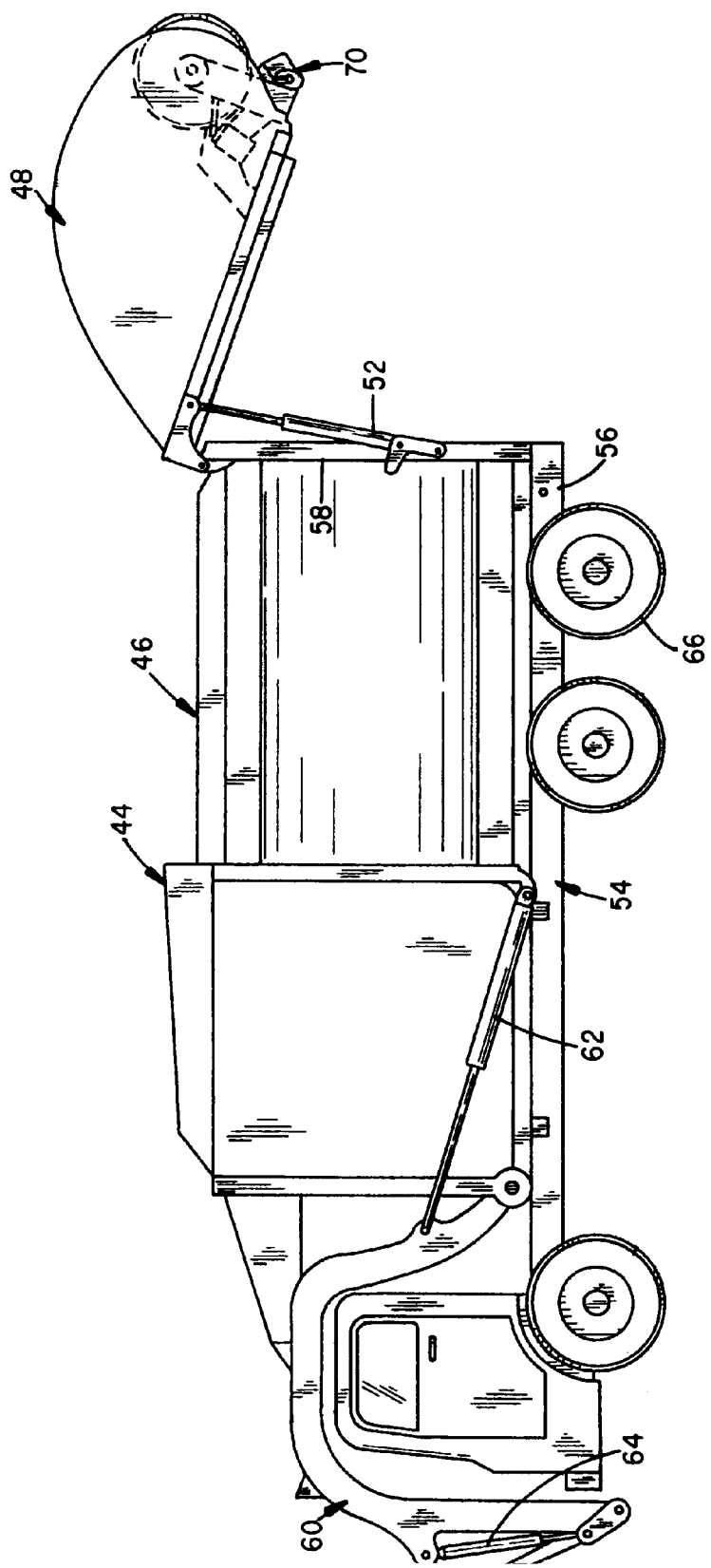
FIG. 3 is a side elevational view of a front loading refuse vehicle shown with the tailgate in the raised position and the tag axle of the invention mounted on the tailgate and in the stowed position.
Figure 4:
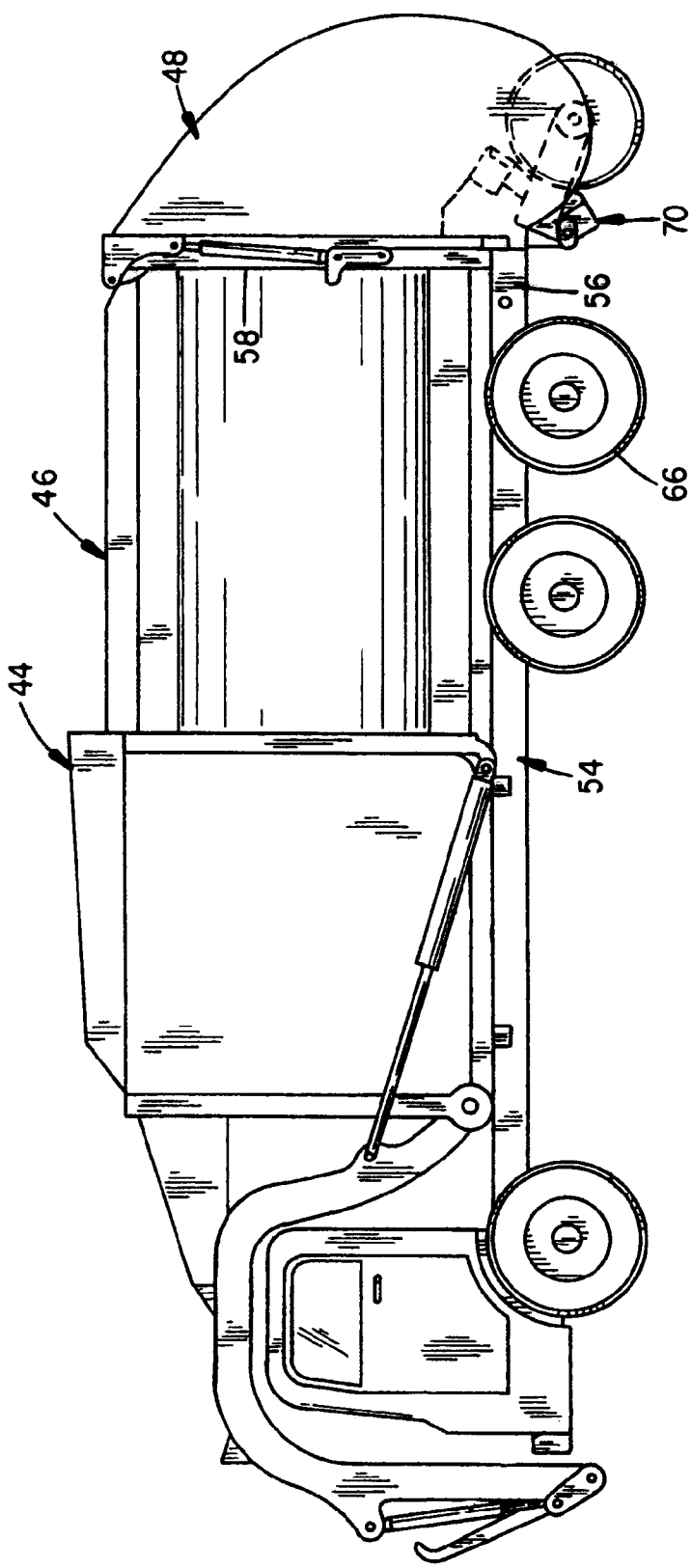
FIG. 4 depicts the refuse vehicle of FIG. 3 with the tailgate closed and the tag axle deployed.

In this manner, FIGS. 1–4 are general side elevational views showing a tag axle system in accordance with the invention integral the body or tailgate of a front loading refuse vehicle, generally 40. The vehicle includes a cab section 42, loading and compacting hopper 44 and a material holding or storage body 46. The tailgate 48 is pivotally attached to the storage body 46 by heavy upper hinge system shown in part at 50. The tailgate is operated between a raised position as shown in FIG. 1 or 3 and a closed position as shown in FIGS. 2 and 4 by one or more tailgate operating hydraulic cylinders 52.

The body or storage section and hopper section are mounted on a heavy frame or truck chassis 54 including spaced heavy longitudinal stringer support members as at 56. The rear upper periphery of the storage body 46 may be provided with a sturdy frame including a pair of spaced vertical members 58. The truck chassis frame also carries the cab section 42 and the lift and dump mechanism 60, built to empty refuse containers into the refuse receiving hopper section 44. Lift and dump hydraulic cylinders 62 and 64 operate the lift and dump mechanism 60 to empty refuse containers into the receiving hopper 44 where the refuse is compacted to the rear of the body 46 by an hydraulic compactor (not shown) against the tailgate 48 in its closed position as shown in FIGS. 2 and 4.

A side loading vehicle, of course, is highly conventional and similar with respect to the hopper and storage areas, loading being accomplished through side openings in the hopper area rather than using an overhead lift and dump mechanism. Such a device, it is believed, need not be pictured here for an understanding of the present invention.

In FIGS. 1 and 2, the truck frame members 56 and body frame members 58 carry and are supported by the tag axle system shown generally at 70 including tag wheel 72. The tag axle assemblies, themselves, will be described in greater detail below.

In FIGS. 3 and 4, the tailgate 48 is shown carrying the tag axle system 70 with the tailgate in the open and raised position in FIG. 3 and the tag axle assembly in the upper stowed position. In FIG. 4, the tailgate 48 is depicted in the shut and locked position for compacting and transport and the tag axle system 70 in the deployed or ground engaging supporting position. When the vehicle is unloaded, the tailgate is raised and the refuse is pushed rearward out of the body 46. As can be seen from FIGS. 1–4, in the embodiment of FIGS. 3 and 4, the tag axle carried by the tailgate swings up and free of the truck body 46 when the tailgate is opened but remains with the frame or chassis in the embodiment of FIGS. 1 and 2.

FIGS. 5–8 depict enlarged fragmentary side elevational views of the rear portion of side or front loading vehicles which may be similar to those depicted in FIGS. 1–4 showing the details of several embodiments of a tag axle assembly in accordance with the invention. The center of wheel 66 represents the normal rear-most point of support for the conventional front or side-loading refuse hauling vehicle.

Figure 5:
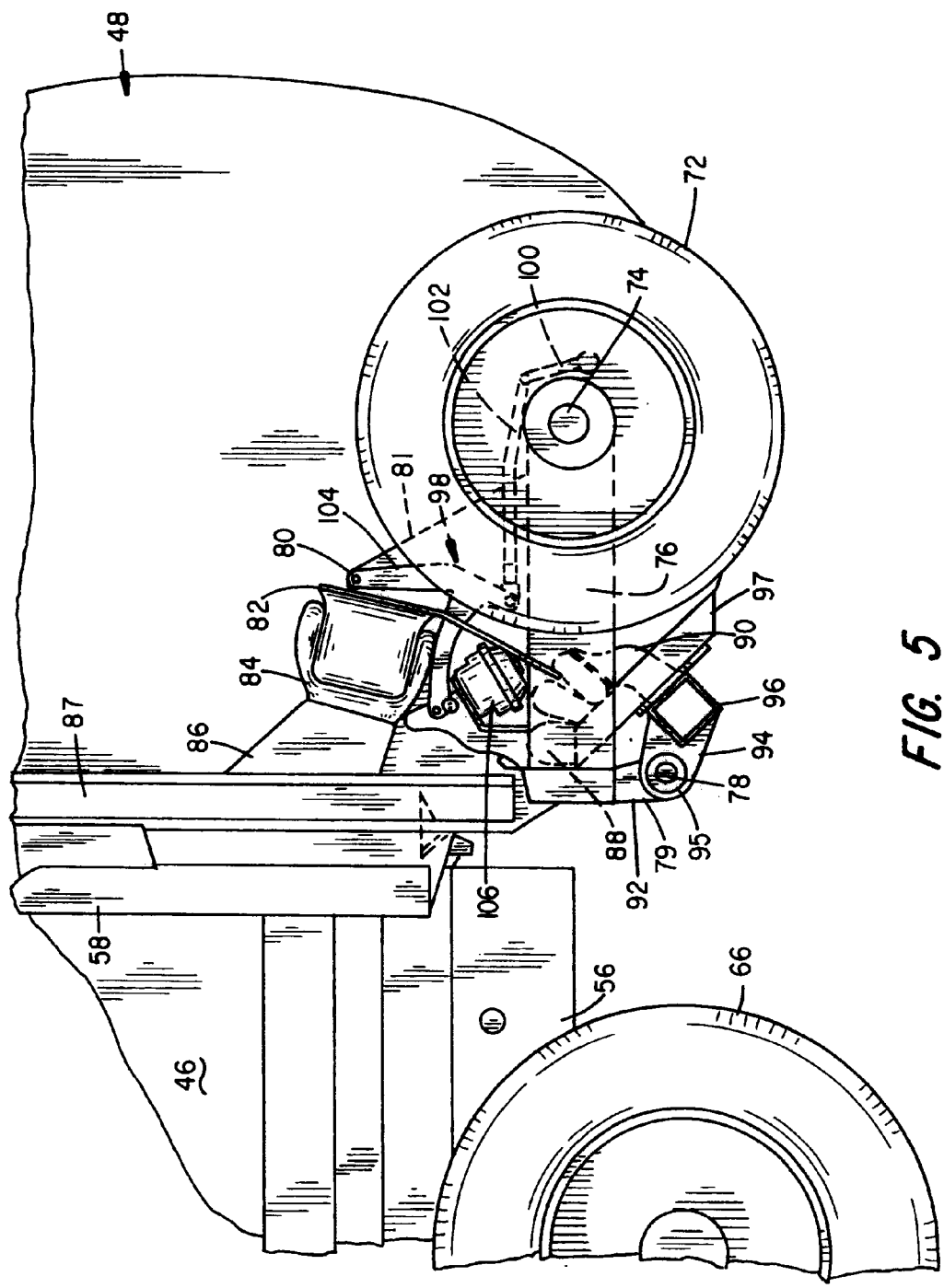
FIG. 5 is an enlarged fragmentary side view representation of a mounted, pneumatically operated tag axle assembly in the raised, stowed position mounted on the tailgate of a front or side loading refuse vehicle.
Figure 6:
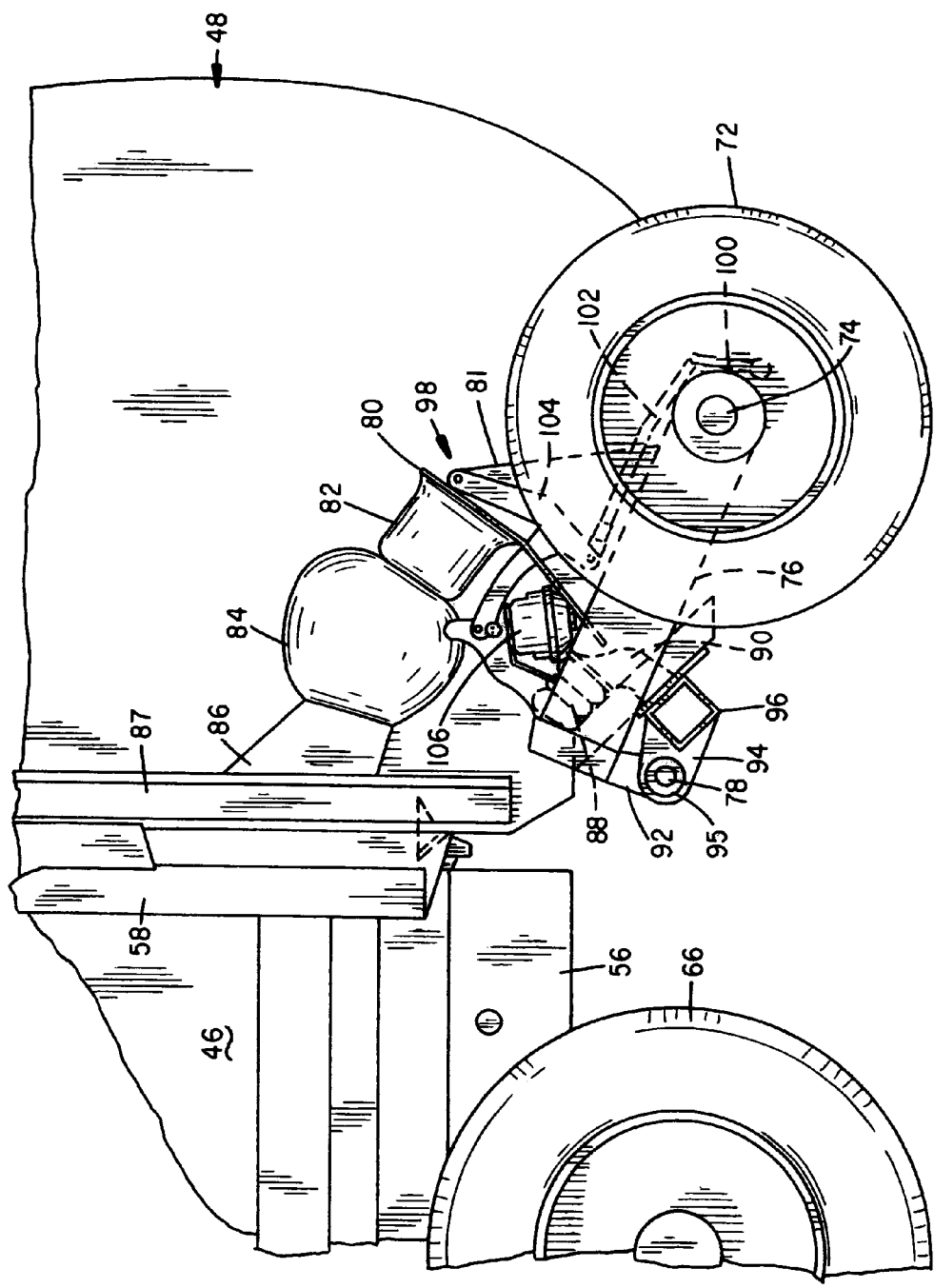
FIG. 6 is a view similar to FIG. 5 showing the tag axle in the deployed position.

The tag axle assemblies depicted in FIGS. 5 and 6 are substantially identical with the tag wheel shown in the stowed position in FIG. 3 and deployed in the ground engaging position in FIG. 4. The system generally includes a tag axle wheel 72 mounted on a stub axle or spindle 74 which, in turn, is carried by an axle mounting lever assembly 76 which is further connected to rotate about a tag pivot shaft 78 using an axle arm pivot mount 79. A torque arm lever 80 with reinforcing plate gusset 81 is mounted between the tag axle mounting lever 76 and a plunger end 82 of a pneumatically operated spring shown collapsed at 84. The other end of the pneumatic spring 84 is connected to a stationary mounting support 86 fastened to tailgate structural members as at 87. A retracting or stowing pneumatic spring 88 is mounted between a stationary mounting support 90 and a retracting torque arm lever 92 which is also attached to the axle mounting lever 76. The tag pivot shaft 78 is journalled in a plurality of connecting plates or pivot lugs 94 as by rubber bushing pivots 95 which, in turn, are fixed to a common transverse shaft or structural member 96 which also carries the tag pivot shaft and symmetrical tag axle assembly associated with the other side of the vehicle (not shown) and which is bolted or welded to a rigid tailgate mounting structure featuring member 97.

In accordance with the tag axle system, a braking system is shown generally at 98 and includes a brake lever 100 pivotally connected to a brake linking pull rod 102, a brake linking bell crank 104 and a pneumatic brake actuator 106. The braking system is conventional and is compact and compatible but itself forms no part of the present invention.

The details of the pneumatically-operated tag axle system of the invention are also more readily understood in conjunction with the fragmentary front sectional view of FIG. 15a taken along lines 15a–15a of FIG. 14. That Figure illustrates the mounting of the tag pivot shaft 78 and its relation to the axle mounting lever assembly 76 and axle arm pivot mount 79. This shows how the operation of the lowering and raising air springs accomplishes a smooth raising and lowering pivotal motion involving the stowing and deployment of the tag axle assembly.

As can be seen in conjunction with the views of FIGS. 5 and 6, for example, in stowing the tag axle wheel, the pneumatic spring 88 is expanded causing the rotation of torque arm 92 and with it the axle arm pivot mount 79 which, in turn, causes the axle mounting lever assembly 76 to rotate counterclockwise and raise the wheel. At the same time, the pneumatic spring 84 is collapsed. Conversely, the expansion of pneumatic spring 84 with the concurrent collapse of spring 88 produces a clockwise rotation of the axle mounting lever assembly 76 and deployment of the tag wheel 72 against the ground. The deployment torque arm 80 is preferably long relative to the retracting torque arm lever 92, and the deploying pneumatic spring 84 is larger than the retracting pneumatic spring 88. In this manner, the mounting lever 76 can be deployed with a great deal of additional force which, of course, is transmitted into load bearing force with respect to the tailgate 48 (or truck body, as the case may be). The stowing system needs only to apply sufficient force to assure that the wheel assembly will remain in the up or stowed position.

Figure 7:
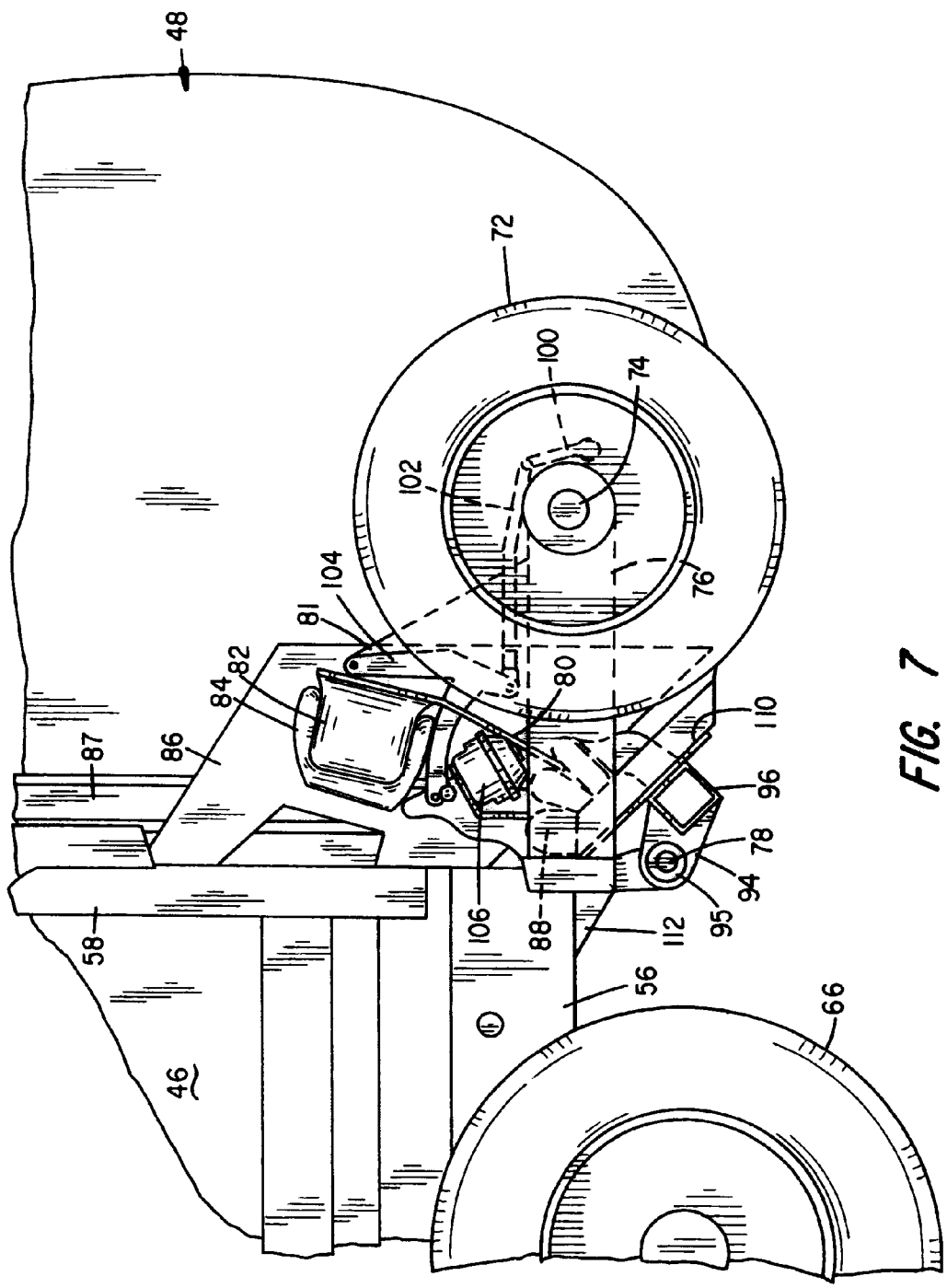
FIG. 7 is a view similar to FIG. 5 with the tag axle assembly mounted on the truck body and in the stowed position.
Figure 8:
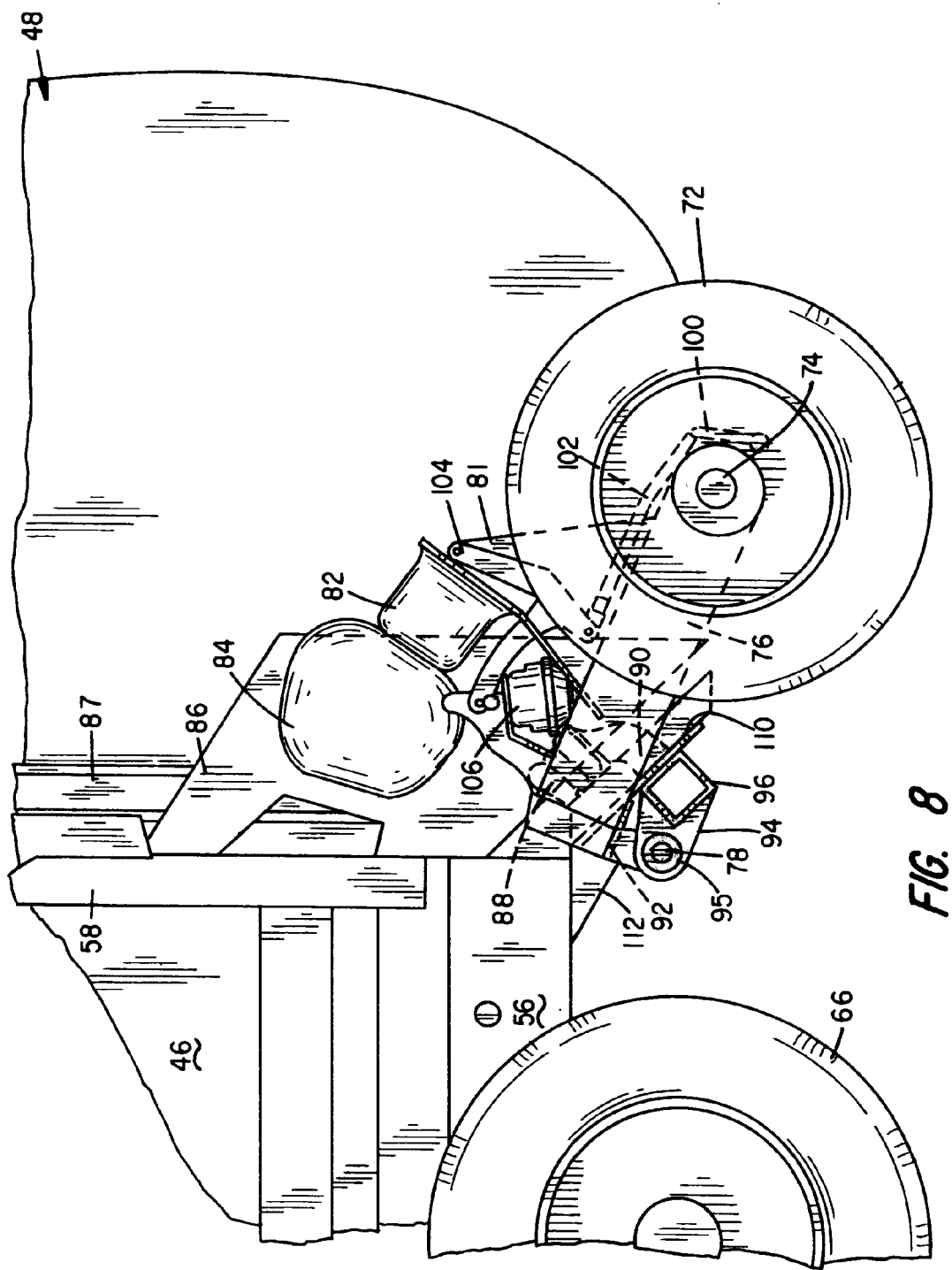
FIG. 8 is a view similar to FIG. 7 with the tag axle in the deployed position.

FIGS. 7 and 8 depict the tag axle system of FIGS. 6 and 7 mounted on the truck body rather than on the tailgate. Note that the transverse common mounting shaft 96 is fixed to a mounting member in the form of a plate 110 fixed to heavy truck frame mounting gusset members as at 112 fastened to the truck chassis including longitudinal structural members 56. The remainder of the tag axle system is as previously described in conjunction with FIGS. 5 and 6. Of course, in this embodiment, the tailgate does not have to carry the weight of the tag axle system when it is raised to unload the refuse. In addition, the upward supporting forces associated with the deployment of the tag axle are directed against the truck and chassis rather than having to be withstood by the tailgate. Stationary mounting support member 86 is fixed to vertical member 58.

FIGS. 9–12 depict a cylinder operated version tag axle system of the type describes with regard to FIGS. 5–8, above. The system is depicted as mounted from and supportive of the tailgate in the stowed and deployed positions in FIGS. 9 and 10 and, similarly, as being mounted on and supportive of the truck frame and chassis in the stowed deployed positions in FIGS. 11 and 12. The details are also more readily understood by viewing these Figures in conjunction with FIG. 15*b* taken along line 15*b*—15*b* of FIG. 9.

The system of FIGS. 9–12 and 15*b* generally includes a tag axle wheel 120 mounted on a stub axle or spindle 122, itself being carried by an axle mounting lever assembly including axle mounting lever 124. The axle mounting lever assembly is further connected to rotate about a tag pivot shaft 126 using an axle arm pivot mount 128. The tag pivot shaft 126 is similarly mounted in a plurality of connecting plates or pivot lugs 130 as by rubber bushing pivots 132, the lugs 130, in turn, being fixed to the common transverse shaft or heavy structural member 134 which is bolted or welded to a rigid tailgate mounting structure including members 136 and 138. The common transverse shaft member 134, of course, also carries the tag pivot shaft and symmetrical tag axle assembly associated with the other side of the vehicle in a similar manner and so is not shown. The entire tag axle system is supported from main tailgate frame members, one of which is shown at 140.

The system is operated by a single double-acting hydraulic cylinder shown at 142 with rod end 144 pivotally attached at 146 to a torque lever arm 148 fixed to tag axle mounting lever 124 and reinforced by a gusset member 149. The cylinder end of the cylinder 142 is pivotally attached at 150 to a lug 152 which is fixed to structural member 140. As in the system previously described, the tag wheel is provided with a brake system including a brake lever 154, brake linkage pull rod 156, brake linkage bell crank 158 and pneumatic brake actuator 160 which is connected to and actuated by the conventional pneumatic braking system associated with all the wheels of such vehicles.

Figure 9:
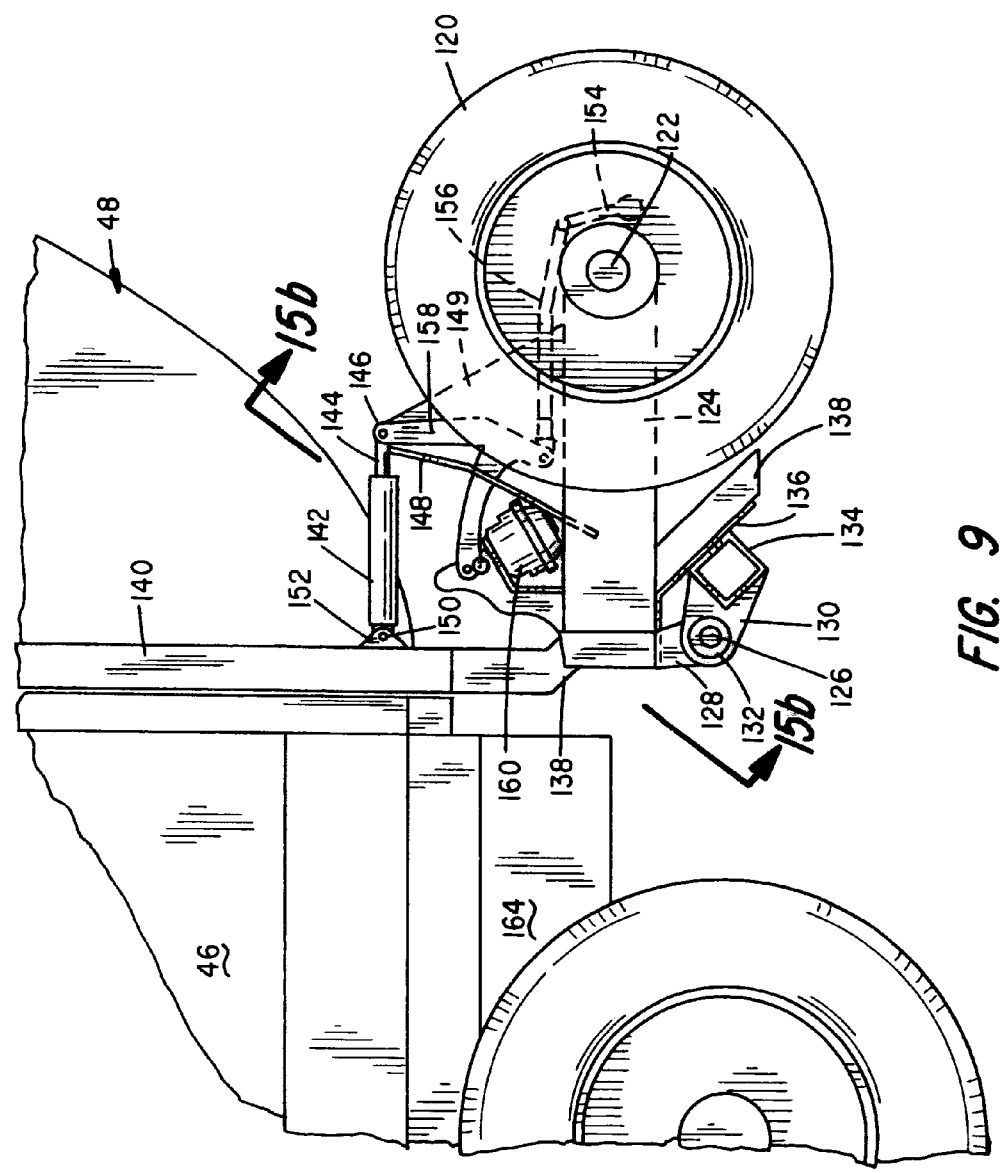
FIG. 9 is an enlarged fragmentary side view of a front or side loading refuse vehicle showing a tailgate mounted, hydraulic cylinder operated tag axle assembly in the raised position.
Figure 10:
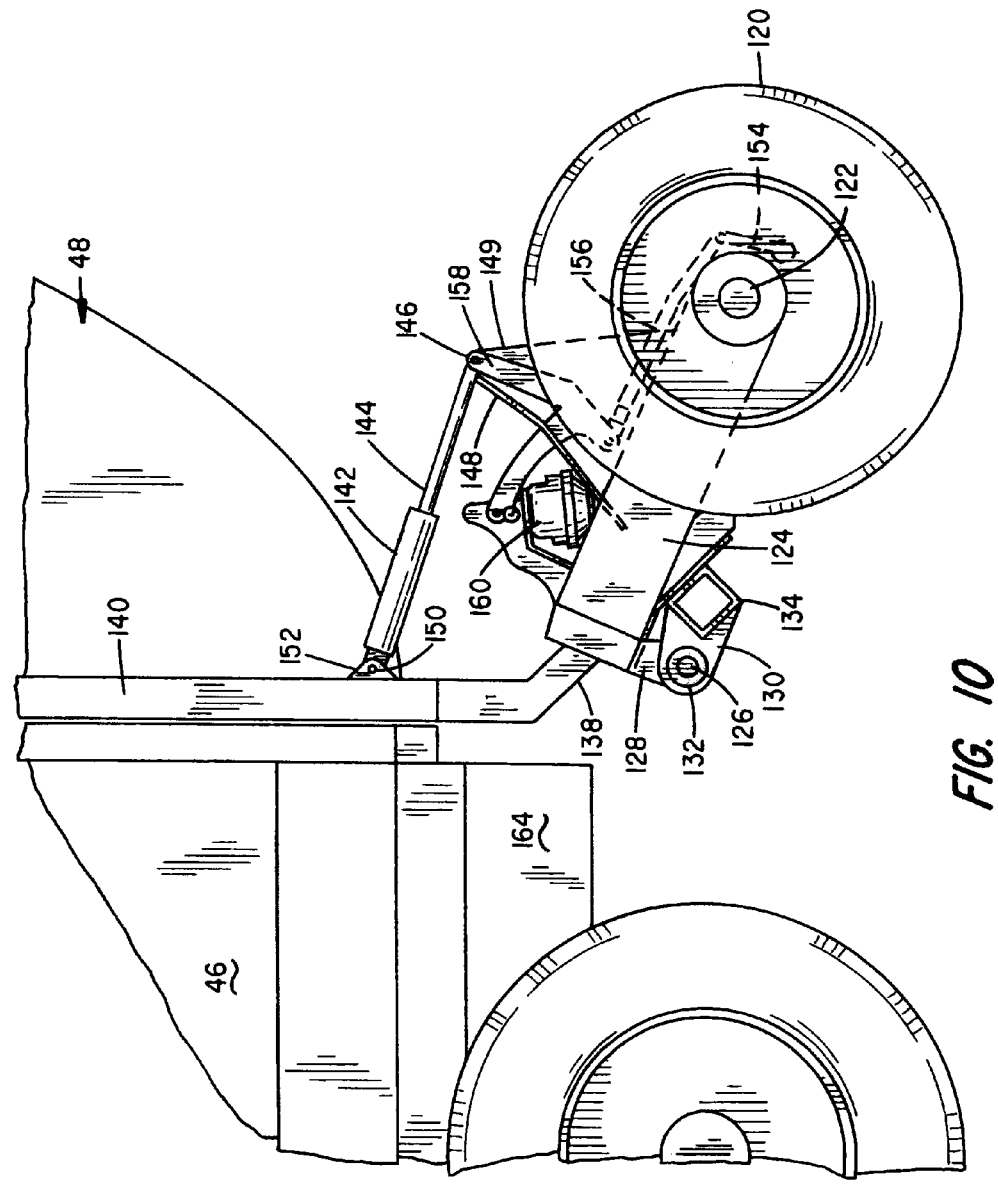
FIG. 10 is a view similar to that of FIG. 9 with the tag axle in the deployed position.

The cylinder 142 is shown in FIG. 9 in the contracted or collapsed position which raises the tag axle assembly into the stowed position. As shown in FIG. 10, the extension of the cylinder 142 causes the rod 144 to force the lever 148 to deploy the wheel 120 in the ground engaging, supporting position. In this manner, each tag axle wheel assembly can be operated by a single hydraulic cylinder operating against a single lever thereby simplifying the system and reducing required moving parts. The cylinder end, of course, can apply greater force to the lever 148 as needed during deployment and such generally will govern the size of the cylinder chosen.

Figure 11:
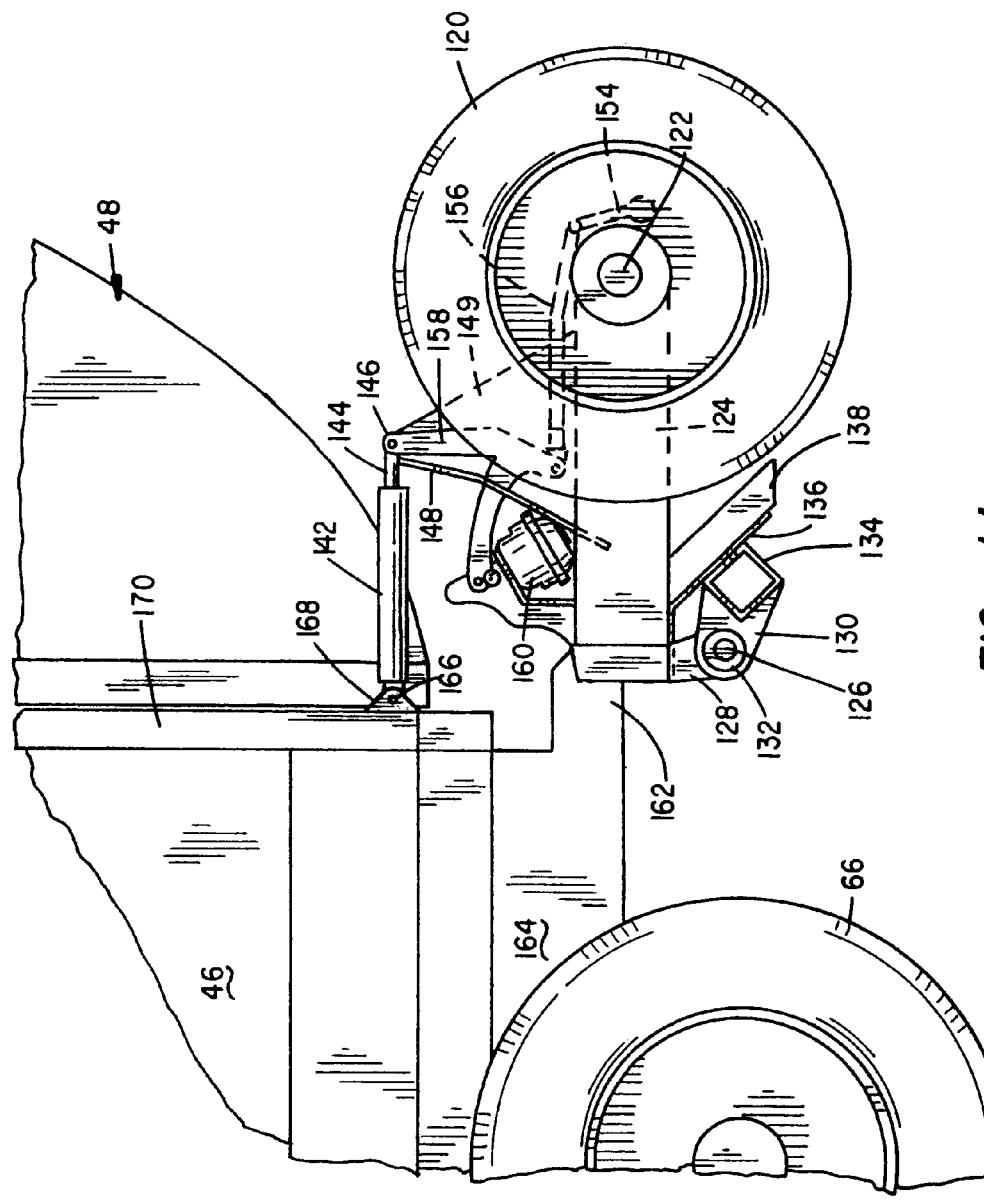
FIG. 11 is a view similar to FIG. 9 with the tag axle assembly mounted on the truck body and shown in the stowed position.
Figure 12:
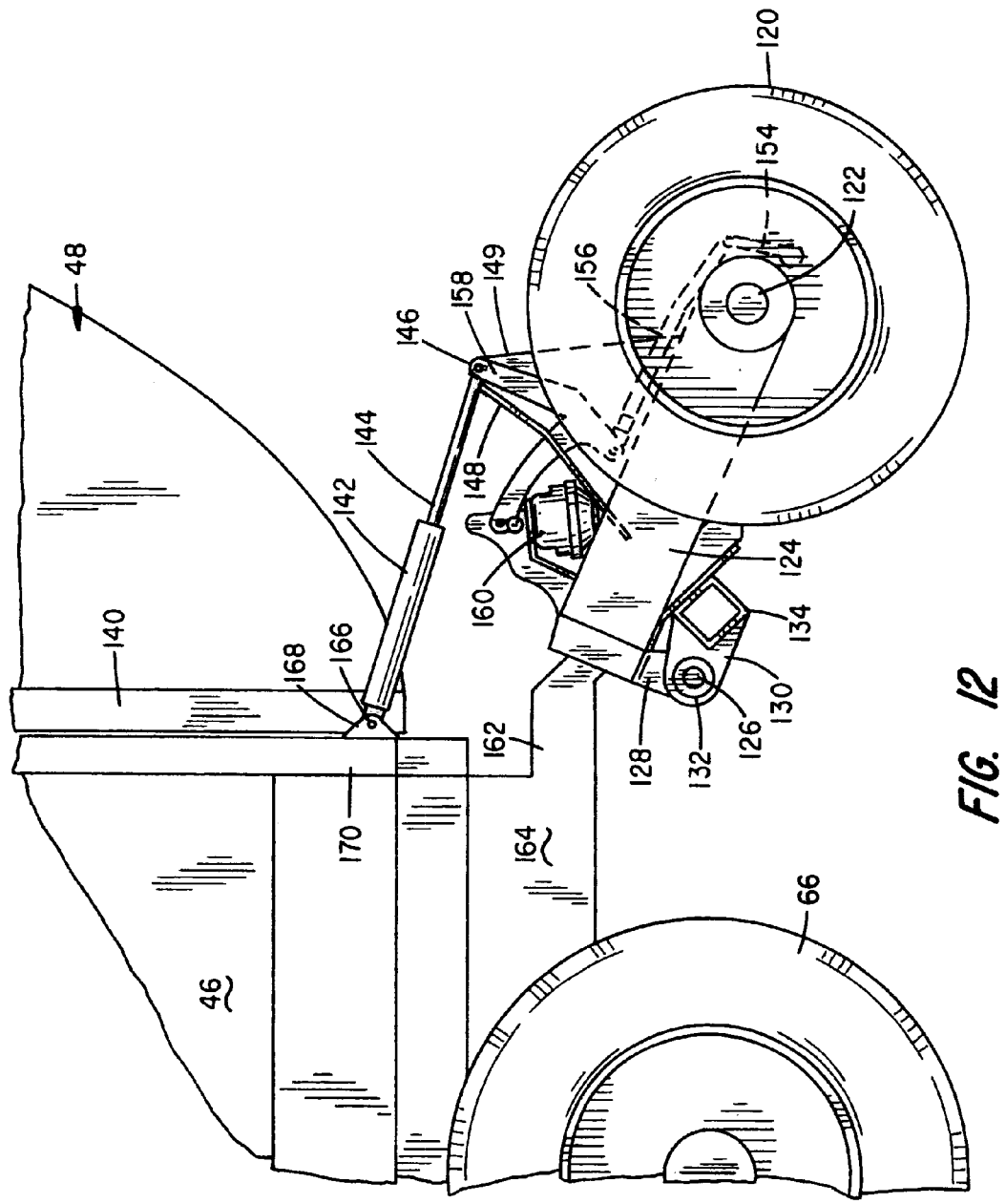
FIG. 12 is a view similar to FIG. 11 with the tag axle shown in the deployed position.

FIGS. 11 and 12 depict the tag axle assemblies of FIGS. 9 and 10 mounted to the truck chassis rather than to the tailgate. In this embodiment, heavy structural members as at 162 fixed to truck chassis longitudinal support members as at 164 carry and transmit the forces associated with the tag axle assembly supporting the transverse shaft or structural member 134. The cylinder 142, in this embodiment, is pivotally mounted at 166 to a lug 168 which itself is fixed to a truck body rear frame structural member as at 170. Operation of this embodiment is identical to that of the embodiment of FIGS. 9 and 10 and the system is shown stowed in FIG. 11 and fully deployed in FIG. 12.

FIG. 13 depicts a fragmentary side view of a rear-loading refuse vehicle depicting the tag axle assembly of the present invention mounted on the tailgate thereof and deployed in its ground engaging position. FIG. 14 depicts an enlarged view of a portion of the pneumatic spring operated system of FIG. 13 shown with the tag wheel in the lifted or stowed position. Thus, in FIG. 13, we have a rear-loading refuse compacting vehicle, generally at 180 including a refuse storage body 182 and tailgate 184. One of a pair of tailgate raising cylinders is shown at 188. The conventional permanent wheels 186 are shown as normally mounted toward the rear of the rear-loading vehicle 180. The pneumatic operated tag axle system of the invention as depicted in FIGS. 13 and 14 is substantially identical to that depicted in FIGS. 5 and 6 with respect to a side or front-loading vehicle. Note that the common transverse shaft or structural member 96 is fixed to heavy lower structural network of the tailgate including frame members 192.

FIG. 14 further depicts, in phantom, a manual locking latch 187 with handle 189 which is one of two such devices used to latch the tailgate to the truck body during collection and transport of refuse. The latch must be unfastened prior to unloading the truck. The system operates in the same manner as that described in regard to FIGS. 5 and 6 and the front sectional view of FIG. 15*a* is also applicable.

Figure 17:
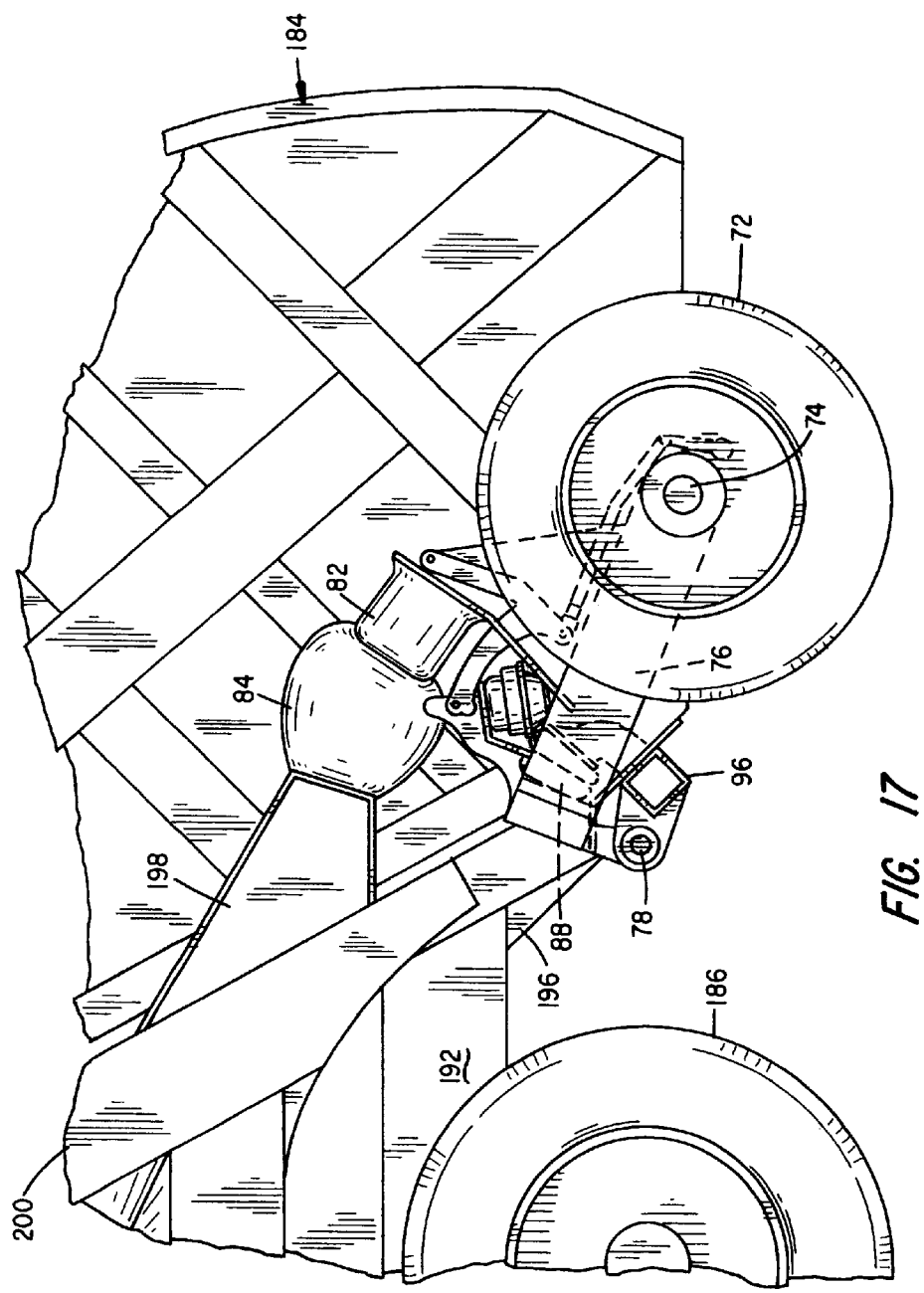
FIG. 17 is a view similar to FIG. 16 with the tag axle shown in a deployed position.
Figure 18:
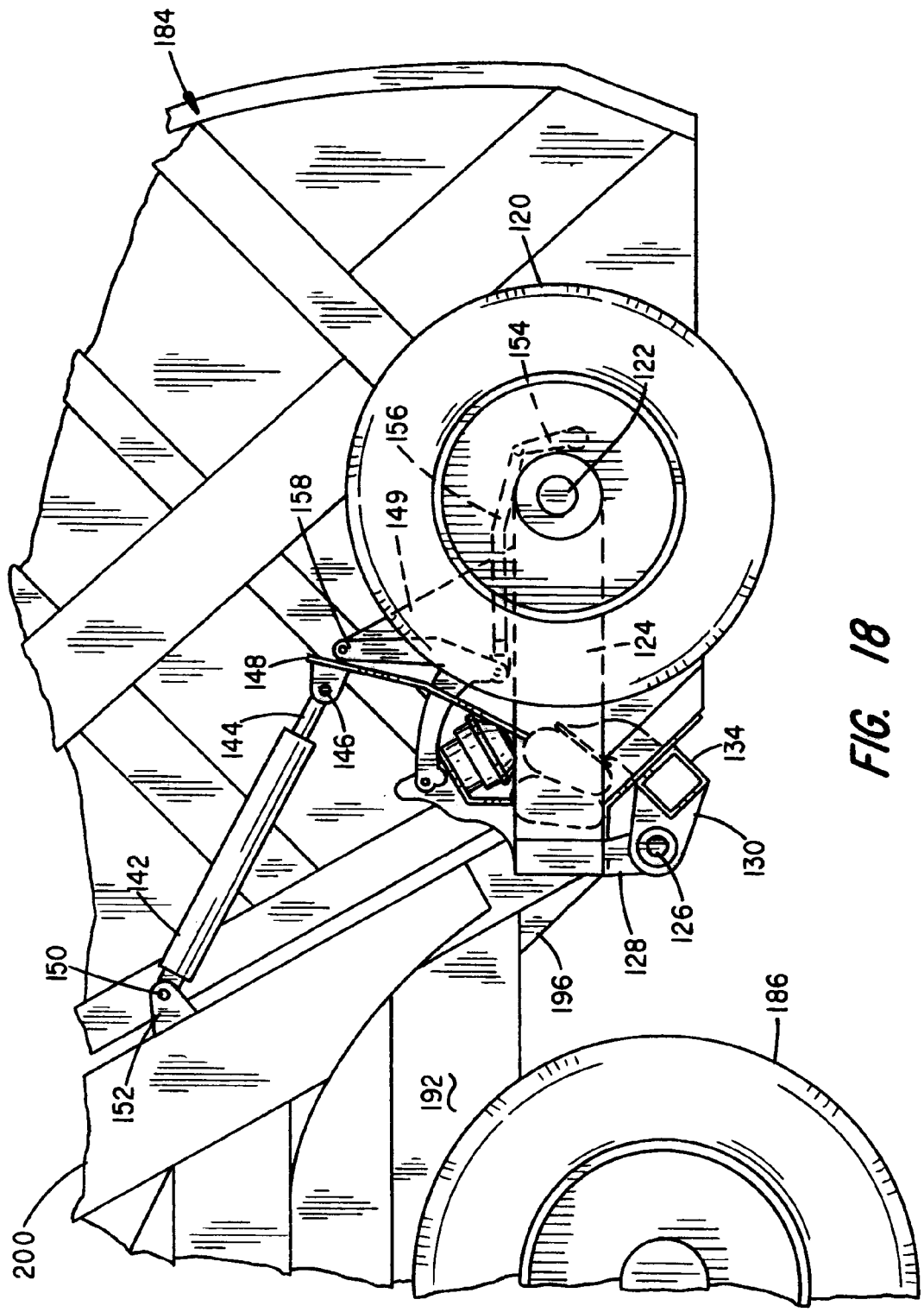
FIG. 18 depicts an enlarged fragmentary side view of a truck body mounted, hydraulic cylinder operated tag axle assembly mounted on the body of a rear loading refuse vehicle and shown in the stowed position.
Figure 19:
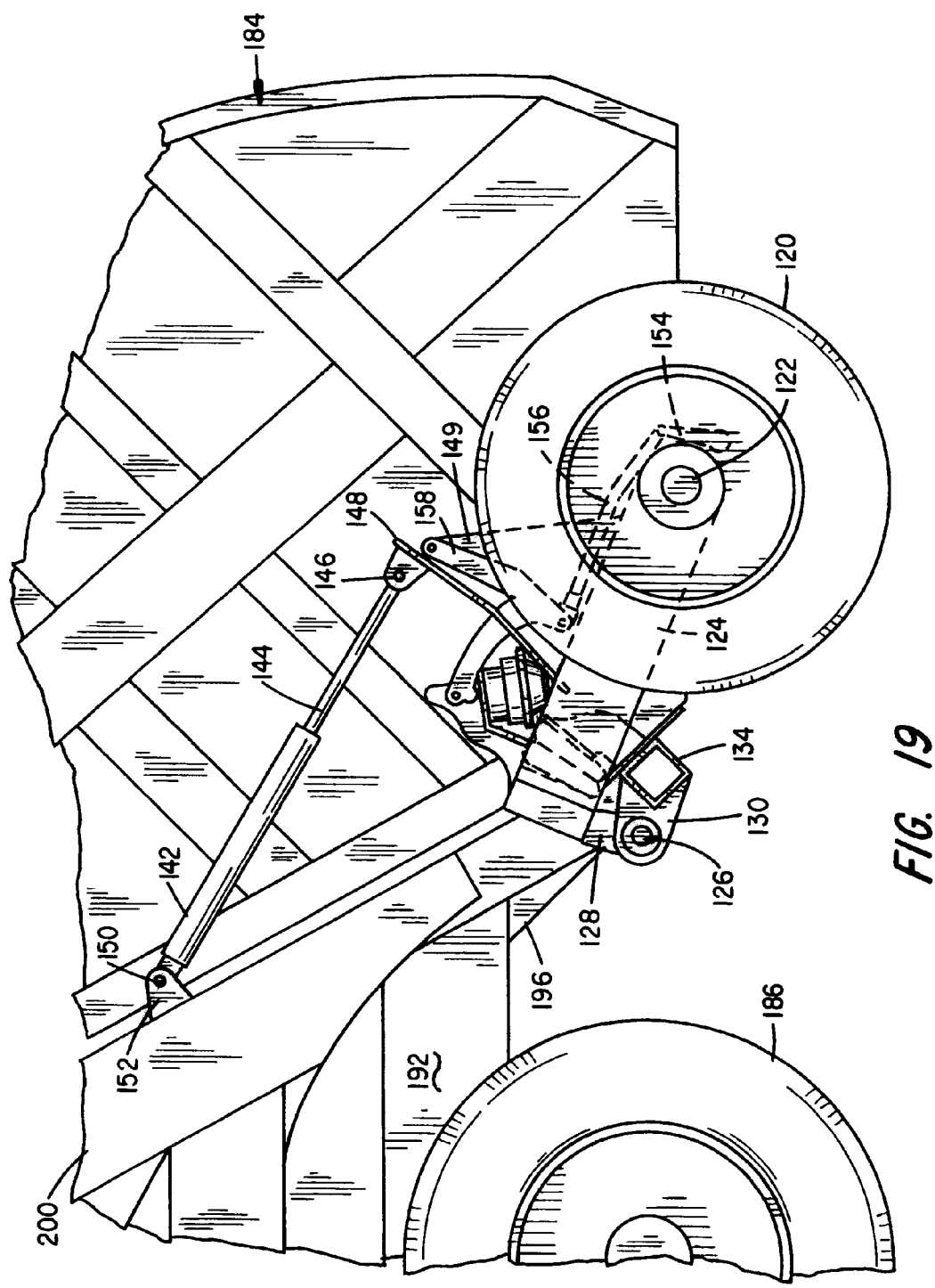
FIG. 19 is a view similar to that of FIG. 18 with the tag axle assembly of the invention shown in the deployed position.

FIGS. 16 and 17 depict the pneumatically operated tag axle assemblies shown in FIGS. 14 and 13, respectively, attached to the vehicle body and chassis and in the stowed and deployed positions. As was the case with reference to FIGS. 7 and 8, an auxiliary structural system including members 194 and 196 are fixed to the structural frame including longitudinal members 192 to carry the common member 96. The stationary mounting support 198 for mounting air spring 84 is connected to a truck body frame member as at 200.

Figure 20:
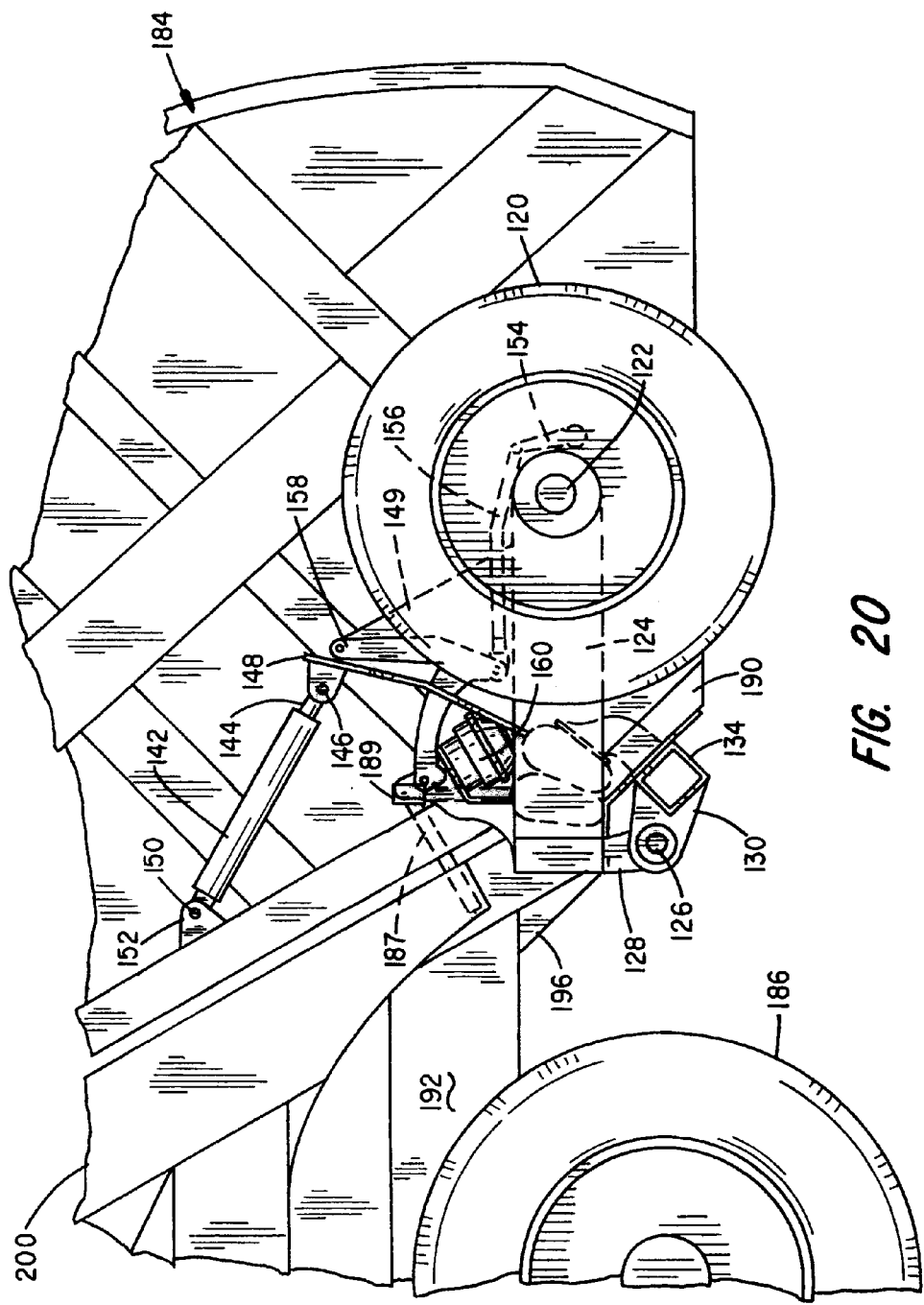
FIG. 20 depicts a view similar to that of FIG. 18 showing the tag axle assembly of the invention as a tailgate mounted unit in the stowed position.
Figure 21:
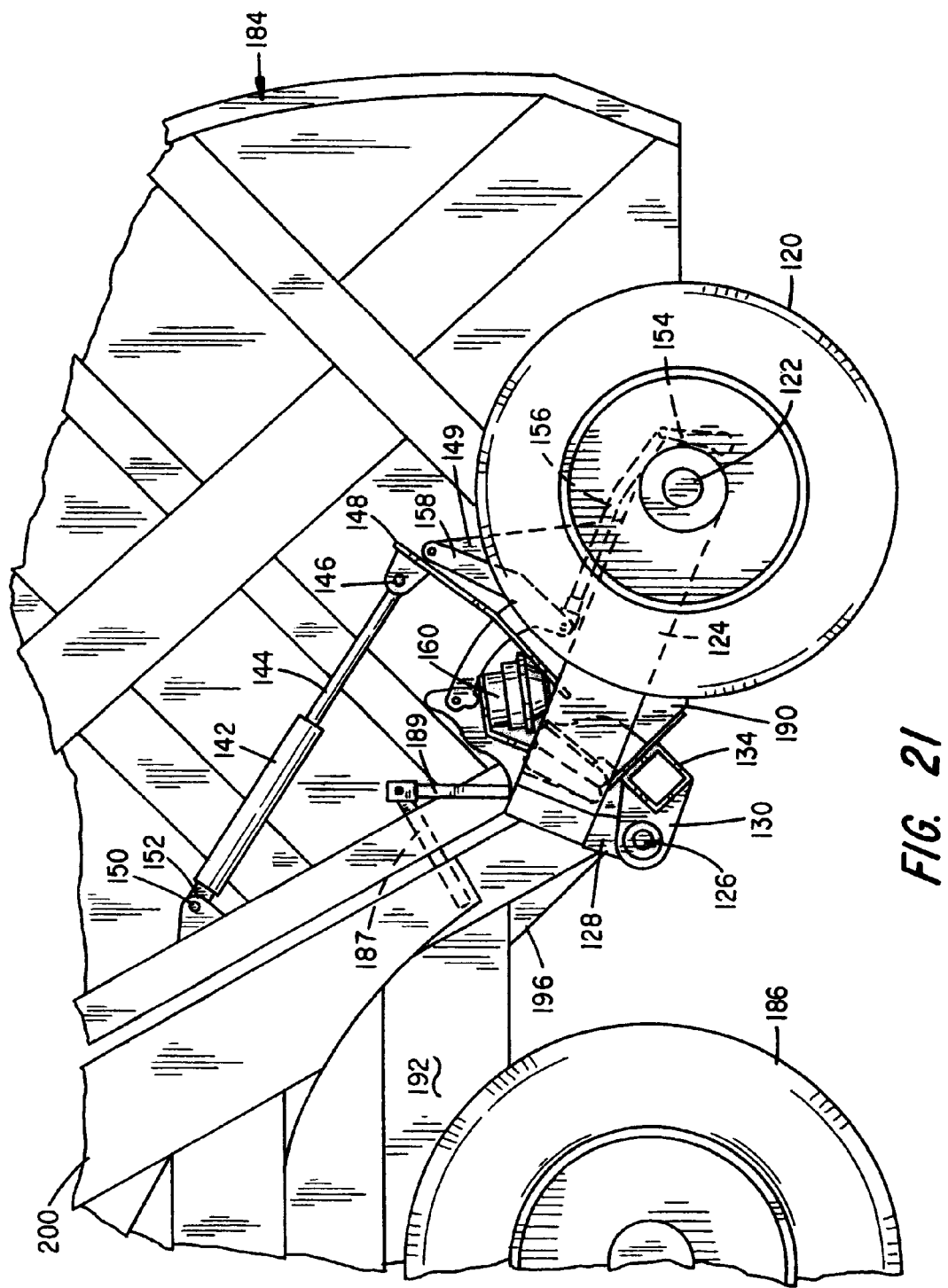
FIG. 21 is a view similar to FIG. 20 with the tag axle assembly of the invention shown in the deployed position.

FIGS. 18–21 depict fragmentary side views showing an hydraulic cylinder operated tag axle assembly mounted on the rear of the truck body/chassis of a rear-loading refuse vehicle (FIGS. 18 and 19) and to the tailgate of a rear-loading refuse vehicle (FIGS. 20 and 21). The systems for each are shown in both the stowed and deployed positions. The tag axle assemblies themselves may be identical to those depicted in FIGS. 9–12 with respect to tailgate and truck mounted units for side and front-loading vehicles except for the difference in structural modifications with respect to the mounting of the units which also have been described in relation to FIGS. 13, 14, 16 and 17.

It should further be appreciated that the maximum amount of force or support afforded by the tag axle systems of the invention can be varied by the use of pressure limiting devices with regard to the pneumatic or hydraulic pressure applied to the deployment springs 84 or cylinders 142 in any well-known manner. Resizing these devices as desired or changing the length of the lever arm 80, 148 will also modify the effect of the tag axle system.

This invention has been described herein in considerable detail in order to comply with the Patent Statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

What is claimed is:

1. An auxiliary wheel system for a refuse vehicle including:
   (a) a pair of spaced tag axle assemblies;
   (b) a common rotatable transverse tag pivot shaft member carrying axle mounting levers for both spaced tag axle assemblies which, in turn, are mounted to rotate said tag pivot shaft member, thereby coordinating the operation of said pair of spaced tag axle assemblies;
   (c) each said pair of tag axle assemblies further comprising:
      (1) a suspension system including an axle mounting lever mounted to rotate said transverse journal mounted tag pivot shaft and carrying a stub axle and a wheel on the stub axle;
      (2) fluid operated deployment means including lowering and lifting pneumatic springs for lowering and lifting said tag axle between a ground engaging vehicle supporting position and a stowed position;
      (3) lowering and lifting torque arm levers respectively operated by said lowering and lifting pneumatic springs, said lowering torque arm lever being connected between one end of said lowering pneumatic spring and said axle mounting lever, said lifting torque arm lever being connected between one end of said lifting pneumatic spring and said axle mounting lever;
      (4) each of said lowering and lifting pneumatic springs being mounted between a respective one of said lowering and lifting torque arm levers and a stationary mounting support and in fixed relation thereto.

2. The system of claim 1 wherein said auxiliary wheel system is carried by and fixed to a tailgate of a refuse truck.

3. The system of claim 2 wherein said refuse truck is selected from front loading, side loading and rear loading vehicles.

4. The system of claim 3 wherein said refuse truck is a rear loading vehicle.

5. The system of claim 2 wherein said auxiliary wheel system is carried by and fixed to a tailgate of a rear-discharging refuse vehicle.

6. The system of claim 5 wherein said refuse vehicle is selected from front loading, side loading and rear loading vehicles.

7. The system of claim 6 wherein said refuse vehicle is a rear loading vehicle.

8. A selectively deployable auxiliary wheel system for a vehicle including a pair of spaced tag axle assemblies each of which comprises:
   (a) a suspension system including an axle mounting lever carried by a transverse joural mounted tag pivot shaft and carrying a tag axle and a wheel on the tag axle, said axle mounting lever being mounted to rotate said tag pivot shaft during lowering and lifting of said tag axle;
   (b) lowering and lifting torque lever arms mounted and fixed to said axle mounting lever;
   (c) a fluid operated tag axle deployment system for moving the tag axle between a ground engaging vehicle supporting position and a stowed position, said deployment system including fluid operated lowering and lifting pneumatic springs to control the operation of the tag axle, each said pneumatic spring being attached in a non-pivoting fashion between a stationary mounting support and a corresponding one of said lowering and lifting torque lever arms; and
   (d) wherein the displacement of a corresponding torque lever arm relative to the stationary mounting support by said lowering and lifting pneumatic springs rotates said tag pivot shaft and thereby controls the deployment of the tag axle between a ground engaging vehicle supporting position and a stowed position.

9. The system of claim 8 wherein said transverse tag pivot shaft is a common continuous member carrying the axle mounting levers for both spaced tag axle assemblies which, in turn, are mounted to rotate said tag pivot shaft, thereby coordinating the operation of said pair of spaced tag axle assemblies.

10. The system of claim 8 wherein said auxiliary wheel system is carried by and fixed to a tailgate rear discharging refuse vehicle.

11. The system of claim 8 wherein said auxiliary wheel system is adapted to be carried by and fixed to a structure selected from the group consisting of a chassis of a refuse vehicle and a truck body carried by a chassis of a refuse vehicle.

12. The system of claim 11 wherein said refuse vehicle is selected from front loading, side loading and rear loading vehicles.

13. The system of claim 11 wherein said refuse vehicle is selected from front loading, side loading and rear loading vehicles.

\* \* \* \* \*